United States Patent [19]

Kromrey

[11] Patent Number: 4,769,197
[45] Date of Patent: Sep. 6, 1988

[54] METHOD FOR MOLDING PRECURED HIGH TEMPERATURE RESINS

[75] Inventor: Robert V. Kromrey, Campbell, Calif.

[73] Assignee: United Technologies Corporation, Hartford, Conn.

[21] Appl. No.: 10,238

[22] Filed: Feb. 2, 1987

[51] Int. Cl.⁴ .................. B29C 43/10; B29C 43/30
[52] U.S. Cl. .................................. 264/136; 264/258; 264/313; 264/331.12
[58] Field of Search ............... 264/40.1, 40.2, 233, 264/DIG. 51, 257, 316, 29.5, 314, DIG. 50, 552, 546, 572, 313, 325, 500, 544, 570, 137, 136, 510, 258, 331.12; 425/78, 387.1, 405 H, 405 R, 407, DIG. 14, DIG. 44

[56] References Cited

U.S. PATENT DOCUMENTS

| | | | |
|---|---|---|---|
| 3,666,600 | 5/1972 | Yoshino | 156/382 |
| 3,772,418 | 11/1973 | Johnson | 264/331.19 |
| 3,966,864 | 6/1976 | Stenzenberger | 264/137 |
| 4,012,415 | 5/1977 | Chang | 264/137 |
| 4,058,581 | 11/1977 | Park | 264/137 |
| 4,409,048 | 10/1983 | Hatch | 264/80 |

FOREIGN PATENT DOCUMENTS 2134168  1/1973  Fed. Rep. of Germany ...... 264/320

Primary Examiner—James Lowe
Assistant Examiner—Jeremiah F. Durkin, II

[57] ABSTRACT

A method for molding composite prepregs using high temperature substantially cured thermosetting resins that reduces fiber damage. Fiber plies are impregnated with solutions of high temperature substantially cured thermosetting resins and the plies are stacked to form a prepreg. A solid flowable particulate silicone rubber is caused to apply pressure to the prepreg to form a composite.

This invention makes a significant advance in the field of molding high temperature resin composites by providing methods of molding that reduce fiber damage, shorten molding time and result in denser parts.

7 Claims, 1 Drawing Sheet

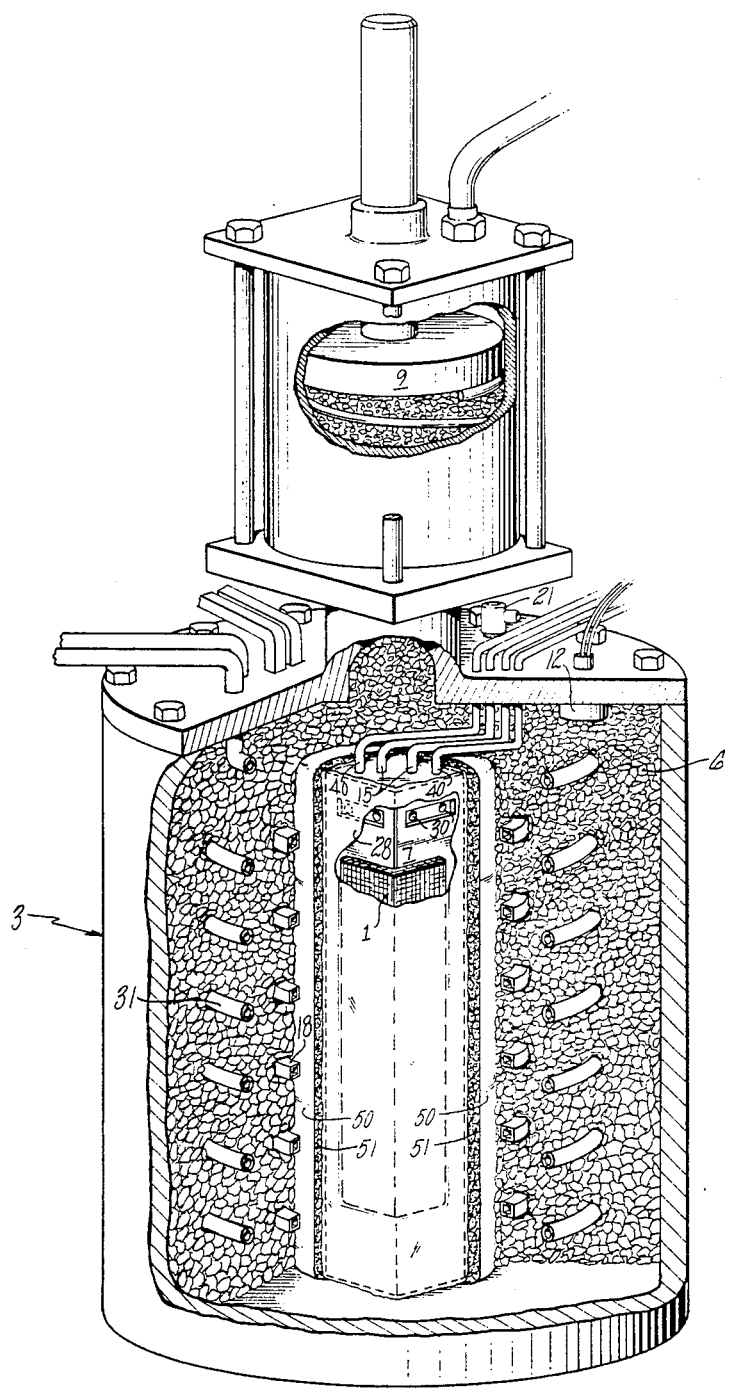

METHOD FOR MOLDING PRECURED HIGH TEMPERATURE RESINS

DESCRIPTION

1. Technical Field

The field of art to which this invention pertains is methods for molding composites.

2. Background Art

Generally, thermoplastic resins soften and even flow with the application of sufficient heat. During the manufacture of fiber reinforced composites, fiber damage can be reduced by the addition of heat sufficient to cause the resin to flow.

However, precured thermosetting resins generally do not flow with the application of heat and pressure. This characteristic greatly reduces the feasibility of making fiber reinforced composites with precured resins since the fibers can be damaged with the application of pressure.

Fiber damage is also a function of the molding process. For example, fiber damage can occur when articles are molded in matched metal dies (compression molding). Material trapped between the mold forces is often unable to flow out easily, resulting in crushed fibers. Careful placement of the molding compound in the mold can help the distribution, but is impractical for complicated shapes. Only a slight misplacement of material can cause a defective area containing crushed fibers or resin starvation (excessive squeeze-out).

Conventional isostatic molding processes (autoclaves and hydroclaves) cannot apply sufficient pressure at the high temperatures necessary to process resins that flow or cure at temperatures above 400° C. (750° F.). Vacuum bags needed with those processes can be unreliable and expensive. The claves can also be hazardous, due to the stored energy of the pressurizing media. Small vacuum bag leaks can cause loss of the pressure differential needed to maintain the desired molding force.

Accordingly, there has been a constant search in this art for methods of molding composites resulting in reduced fiber damage.

DISCLOSURE OF INVENTION

This invention is directed to a method for molding composite prepregs using high temperature substantially cured thermosetting resins that reduces fiber damage. Fiber plies are impregnated with solutions of high temperature substantially cured thermosetting resins and the plies are stacked to form a prepreg. A solid flowable particulate silicone rubber is caused to apply pressure to the prepreg to form a composite.

This invention makes a significant advance in the field of molding high temperature resin composites by providing methods of molding that reduce fiber damage, shorten molding time and result in denser parts.

The foregoing and other features and advantages will become more apparent from the specification and claims and from the acccompanying drawing which illustrates an embodiment of the invention.

BRIEF DESCRIPTION OF DRAWING

The FIGURE illustrates a perspective view cutaway of an apparatus for performing the molding method of the present invention by controlling the temperature and pressure of the pressurizing polymer medium.

BEST MODE FOR CARRYING OUT THE INVENTION

It is preferred to use high temperature thermosetting resins in this invention because they can withstand high temperature use without melting and they tend to coalesce under high temperatures and pressures. In contrast, thermoplastic resins are not as applicable because high temperature use can cause them to melt and flow. By high temperature thermosetting resins is meant those thermosetting resins that have a Tg of greater than about 232 °C. (450° F.). In addition, those thermoplastic resins that behave as a thermosetting resin (i.e., in the classical sense) such as Avimid-N "thermoplastic" polyimide (DuPont de Nemours, Wilmington, Del.) are also included within the definition of high temperature thermosetting resins. It is especially preferred that the resins comprise aromatic nitrogen containing polymers, such as polyimides (PI), polybenzimidazoles (PBI), polyphenylenequinoxalines (PPQ) and bismaleimides (BMI). Exemplary resins include PMR-15 TM polyimide (NASA Lewis), LARC TM 160 polyimide (NASA Langley) and CELAZOLE TM polybenzimidazole (Celanese, Charlotte, N.C.). As used in this invention, the resins are substantially cured. By that is meant the volatile content is preferably less than about 5% because the resins (e.g., PMR-15) may not coalesce as effectively, if they are completely cured. In addition, a greater volatile content can result in blisters and bubbles in the finished composite. It is especially preferred that the volatile content is less than about 3%. In addition, substantially cured means that the polymer will not melt or flow although it may soften when exposed to elevated temperatures. Finally, substantially cured also refers to the fact that the polymers are nearly insoluble in common solvents such as acetone, methylethyl ketone, isopropyl alcohol and lower alcohols. However, the polymers are soluble in solvents such as dimethylacetamide (DMAC), dimethyl sulfoxide (DMSO), normal methyl pyrrolidone (NMP) or concentrated sulfuric acid.

Generally, any fiber may be used in the practice of this invention. However, it is preferred that the fiber has high strength, high modulus and high temperature properties because the high temperature resins are used in advanced composites. It is especially preferred that the fiber comprises graphite, quartz, ceramic or glass. Exemplary fibers are Thornel T-300 TM fiber, available from Amoco Performance Products, Inc. (Ridgefield, Conn.) and NEXTEL TM fiber, available from 3M (Minneapolis, Minn.).

Generally, any solvent may be used as a carrier to impregnate the resin into the fiber layup that can dissolve the substantially cured thermosetting resins described above. Typically, however the more common solvent such as the lower alcohols are not capable of dissolving the above-described high temperature thermosetting resins. In addition, the solvent should not damage the high temperature thermosetting resin to be dissolved or the fibers to be impregnated. An exemplary list of functional solvents is dimethylacetamide, dimethyl sulfoxide, normal methyl pyrrolidone.

The particular medium useful in the present invention is a critical component to the apparatus. Its responsiveness to temperature and pressure coupled with its flowability and solid nature enable it to be useful with the present invention. These properties cause the medium to produce an advantageous, substantially uniform, controllable pressure on the surface of the article precursor. And while this material is described in terms of a polymeric medium, other materials (such as a polymer molten metal mixture) which would have all the characteristics and produce similar results could be substituted. Although a single type of pressurizing medium can be used, two different types of media are preferentially used in a dual media system.

By utilizing two types of medium (a high temperature medium close to the precured resin impregnated fabric composite and a low temperature medium outside of the high temperature medium) the lower cost low temperature medium can be utilized. If the low temperature medium were placed near the precured resin impregnated composite the higher localized temperatures would effectively degrade the polymer medium. However, the higher temperature medium will function as a pressurizing medium throughout the high temperature steps. Such a dual medium system is disclosed in commonly assigned copending U.S. application Ser. No. 907,947 filed Sept. 10, 1986 entitled "Method for Molding Using a Dual Solid Flowable Polymer System", the disclosure of which is hereby incorporated by reference. The high temperature medium is disclosed in commonly assigned copending application Ser. No. 907,946 filed Sept. 10, 1986 entitled "High Temperature Solid Flowable Polymer Medium and Method of Molding Using the Same", the disclosure of which is hereby incorporated by reference. The low temperature medium is disclosed in commonly assigned copending application Ser. No. 907,959 filed Sept. 10, 1986 entitled "Solid Flowable Polymer Molding Medium", the disclosure of which is hereby incorporated by reference. Below is a description of the two types of polymer medium beginning with the low temperature medium.

In a typical embodiment of the invention, the polymer is an unfilled silicone rubber particulate of −4 to +30 U.S. mesh sieve size (4.7–0.42 millimeters (mm)), which when pressurized, is sufficiently self-complaint to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn., USA), believed to be essentially the material which is described in the Bruner U.S. Pat. No. 3,843,601 is also useful with the present invention.

While the preferred materials are silicone rubbers, other polymer materials having the desired characteristics can be used. Most silicone rubbers are temperature limited for long term use, e.g., typically up to about 288° C. (550° F.). Fillers and other adulterants (such as the metal particulates described below) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 centimeters (cm) square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

The aforementioned behavior of the polymer enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present media from those which have been used heretofore, for example, in a pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the medium will have flowability, i.e., mass transport can occur when molding pressures are applied. The preferred medium, when tested in the apparatus described above using 10.3 MPa and a 15.2 cm pipe, has a flow rate of at least 0.6 gram per second (g/s), typically 6 g/s, and desirably 25 g/s. Further description of the low temperature polymer portion of the dual medium system is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a substantially uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compresed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with media having low strength, the ability to self-comply under molding level pressures, and the ability to flow and exhibit hydraulic-like behavior. The tendency toward friability, compared to the SILASTIC ™ tooling rubbers (Dow Corning, Midland, Mich.), has been observed and is believed associated with the flowability behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%.

Having above described the low temperature medium the high temperature medium is now described.

The typical high temperature polymer medium is an unfilled vinylmethylsiloxane-dimethylsiloxane copolymer (VMS-DMS) particulate of −4 to +30 U.S. mesh sieve size (4.7–0.42 mm), which when pressurized, is sufficiently self-compliant to coalesce as an essentially void-free medium at a pressure of the order of 0.103 to 0.138 MPa (15 to 20 psi).

Typically, a high vinyl content VMS-DMS containing rubber is used as the high temperature pressurizing medium. Most preferably, the rubber is an improvement on the low temperature medium identified above. By high vinyl content is meant about 10% to about 100% vinylmethylsiloxane. Exemplary VMS-DMS compositions are described in U.S. Pat. No. 4,581,391 assigned to the U.S.A., the disclosure of which is hereby incorporated by reference. These vinyl siloxanes may be produced by conventional commercial procedures. It is especially preferred that a vinyl siloxane having about 40% to about 60% vinyl groups is used because they remain elastomeric at higher temperatures (e.g., about 454° C. to about 482° C.). A preferred material which has been used thus far is the experimental unfilled vinyl siloxane material designated as No. 8026 by the Dow Corning Corporation (Midland, Mich.).

Other Dow Corning vinyl polymers Nos. X5-8800, 8801, 8024 and 8025 are also useful. The QCII-1010X polyvinylmethylsiloxane (Quantum Company, Michigan) is also useful with the present invention.

While the preferred materials are VMS-DMS rubbers (elastomers) other polymer materials having the desired characteristics can be used. For example, methylphenysiloxane (MPS), vinylmethylsiloxane containing thermal stabilizers and silphenylene have excellent high temperature and flow properties. Fillers and other adulterants (such as metal particulates) can be included with and within the medium, provided the essential behavior properties (e.g., flowable) are maintained.

In a similar fashion to the preferred low temperature medium the preferred high temperature medium (vinyl siloxane rubber) is characterized by low strength and high friability.

The preferred 8026 material has a Shore A hardness of less than 15 and compressive strength of the order of 3 MPa when measured on a 2.5 cm square by 1.27 cm thick specimen, and upon a compression deformation of about 40 percent it shears into smaller particles. Again the preferred polymer 8026 (like the low temperature medium) useful with the present invention when forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

In one embodiment of the invention, the polymer has a Shore A hardness of less than about 15, and desirably less than 10; the compressive strength is less than 0.345 MPa (50 psi), and desirably less than 0.207 MPa (30 psi).

Again, the high temperature medium is characterized by it's ability to flow. Thus, generally it can be said that the medium will have flowability, i.e., mass transport can occur when molding pressures are applied. The preferred medium, when tested in the apparatus described above using 10.3 MPa and a 15.2 cm pipe, has a flow rate of at least 0.6 g/s, typically 6 g/s, and desirably 25 g/s.

As with the low temperature medium the high temperature medium particles self-comply and coalesce into a continuous void-free body. Because of this and their inherent resilience, a substantially uniform hydraulic-like pressure is applied to the article precursor surface. Tests show that the 8026 material will tend to coalesce upon the application of moderate compressive pressure, of the order of 125–150 kPa; at this point the interfacial boundaries between the particles are so essentially conformed that the compressed rubber becomes translucent instead of opaque. The 8026 material has a true density of 0.97 g/cc, an apparent bulk density of 0.5 g/cc as a −30 mesh size powder, and it is compressed to a coalesced translucent material with a density of 0.90–0.97 g/cc by the application of about 150 kPa (21.8 psi). (Further compression of captured material, in the range 150 kPa (21.8 psi) to 13.8 MPa (2000 psi), shows it to have about 0.4% volume change per 10

MPa (1450 psi).) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 250 kPa, preferably 150 kPa; more preferably about 100 kPa.

In addition to the above-described properties, the high temperature medium (unlike the low temperature medium) is capable of flowing at temperatures and pressures in excess of about 316° C. (600° F.) and 0.689 MPa (100 psi), respectively. By capable of flowing is meant providing essentially uniform isostatic pressure (within about 10%). This facilitates molding at the higher temperatures that carbon-carbon composites require. Specifically, the vinyl silanes having about 40% to about 60% vinyl groups are capable of flowing at temperatures below room temperature to about 538° C. (1000° F.) at pressures of about 0.689 MPa (100 psi) to about 20.682 MPa (3000 psi). It is believed that pressures up to 20,000 psi can be used. Another property characterizing the high temperature medium and differentiating it from the low temperature medium is that the medium is substantially thermally stable for use at temperatures in excess of about 316° C. (600° F.). By substantially thermally stable is meant the medium remains sufficiently flexible (elastic) to transmit molding pressure to an article during its entire cure cycle. Thus as temperatures in excess of about 482° C. (900° F.), the polymer can still function as a load transfer medium. It is critical that at these temperatures, the polymer must be chemically stable such that it will not revert (depolymerize) resulting in oily residue as these oils are very intrusive and can contaminate the article being molded (e.g., resin containing composite). These polymers may give off small smounts of decomposition products which may be removed by a suitable gas vent in the pressure vessel. This property facilitates processing (molding) at the higher temperatures that carbon-carbon composites require. Mediums that are not stable above these temperatures do not work in the present invention as they revert to oily monomers or decompose. Alternatively, portions of the polymer may be transformed (e.g., pyrolyzed) to a hardened state and even upon being ground are not flowable. The pyrolyzed polymer, however, will transmit molding pressure to an article if sufficient unpyrolyzed material remains to back it up.

Specifically, the vinyl silanes having about 40% to about 60% vinyl groups are capable of transmitting molding pressure at temperatures up to about 649° C. (1200° F.) at pressures of about 0.682 MPa (100 psi) to about 20.68 MPa (3000 psi). It is also believed that pressures as high as about 137.88 MPa (20,000 psi) will work.

Silicone rubbers other than 8026 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

As with the low temperature material an even pressure on various points of the article to be molded is important. Comparative tests run on the granular 8026 material showed a maximum variation in pressure of as low as 350 kPa (0.35 MPa) (51 psi) typically less than about 210 kPa (0.21 MPa) (31 psi) at about 6.9 MPa (1000 psi) nominal pressure; other useful materials produced pressure uniform with 10%.

The low and high temperature media have only been characterized according to the properties of some currently available materials; the data are insufficient to establish that the totality of measured properties in combination are necessary. On the contrary, to a significant extent it is believed there is a redundancy and that they independently characterize the invention.

High temperature thermosetting resin composites may be made using precured high temperature thermosetting resins as follows. Although this detailed procedure is particularly adapted to precured polybenzimidazoles, it applies to thermosetting resins in general. The high temperture thermosetting resin is dissolved in a suitable solvent (described above) to about 15% to about 25% solids. Below about 15% solids, the resin is too diluted and above about 25%, the viscosity is too high. The resin solution is typically kept hot (e.g., about 100° C.) in order to lower the viscosity and aid penetration of the fiber fabric. The fiber fabric is impregnated with the resin solution to obtain a resin content of about 25% to about 45% after drying. Below about 25%, there is not enough resin to fill the interstices of the fabric and above about 45%, the fiber/resin ratio becomes too high for high performance. The impregnated fabric is air dried in order to remove the solvent after the coating operation because the solvent would increase volatiles during molding operations. Then a water rinse is used to remove any residual solvent (at the surface of the resin) and stabilization ingredients (e.g. lithium chloride used for stabilization of resin solutions) as otherwise the residual solvent and stabilization ingredients may contaminate the article being molded. The impregnation, drying and rinsing steps are repeated until the desired resin content is obtained. Typically, this may take two or three cycles. Subsequent to the final cycle, the prepreg is dried at about 93° C. (200° F.) to about 121° C. (250° F.) for about two hours in a circulating air oven in order to remove residual solvent. The dried prepreg is cut into suitable patterns to form the desired article to be molded. The patterns are then placed onto a suitable heated form (mandrel) and taped into place. It is preferred to debulk the prepreg by a vacuum bag or shrink tape in order to minimize the amount of compaction which occurs during the subsequent molding operation.

A clear understanding of the invention may be had by reference to FIG. 1. FIG. 1 illustrates the pressure vessel partly broken away and partly in section.

The mold form and prepreg are placed in a pressure vessel 3 (e.g., stainless steel, alloy steel) and surrounded with a polymer medium (medium) 6, optionally containing metal particles to increase the thermal conductivity of the medium as disclosed in commonly assigned copending U.S. application Ser. No. 907,943 filed Sept. 10, 1986 entitled "Solid Flowable Polymer Medium with Metal Additives and Method of Molding Using the Same", the disclosure of which is hereby incorporated by reference. It is preferable to have a barrier layer 28 between the medium and the article to avoid contamination of the composite and medium. Unlike a vacuum bag, this layer does not have to be air tight. An exemplary material is conventional aluminum foil. The barrier layer can cover a glass fabric breather layer which is in communication with a vacuum line 40 via gas vent 30. This may be used to remove volatiles from the article. Preferably, two polymer media are used in a coaxial system separated by another barrier layer 50 (e.g., aluminum foil) with the higher temperature medium 51 disposed next to the composite. Typically, less than about 5.1 cm (two inches) of high temperature medium is sufficient. This allows greater use of lower cost medium. The medium may be in contact with more or less of the composite precursor as is desired. Typically, the surface area of the composite precursor 1 not in contact with the medium is disposed (e.g., in contact) next to the tool 7 in order to provide (or maintain) a particular shape to the article 1. A pressurizer (e.g., mechanical piston) 9 can apply the requisite, uniformly distributed medium pressure to the article precursor. However, the pressure is preferably accomplished via the thermal expansion of the low temperature polymer medium 6. Such things as conventional pressure transducers 12 can be inserted in various places within the pressure vessel 3 to detect the requisite pressure. While any pressure can be used with the present invention, typically pressures up to 20.67 MPa (3000 psi) are required for molding precured composite materials. However, it is believed pressures up to 138 MPa (20,000 psi) could be used.

Resistance heaters 15 and preferably induction heating means 18 are used to consolidate the composite to be molded 1. By raising the temperature of the tool or susceptor the heat is transferred to the article. Preferably, a fluid heating/cooling means 31 is used to change the pressure via the large thermal expansion of the pressurizing medium. Typically, the temperature used to expand the pressurizing medium is much less than that used to cure the article precursor. Regulation of this pressure increase can be achieved through a relief valve 21, piston 9 and/or fluid heating/cooling means 31. Thus, tubing 31 can be used alternately to heat or cool the medium depending on whether hot or cold fluids are passed through the tubing to control the pressure independently of the temperature in the cure region.

Returning to the process of molding the composite, heat is applied to the pressurization medium to obtain a pressure of about 0.17 MPa (25 psi) to about 0.34 MPa (50 psi) in the vessel. Then, heat is applied to the article through the tooling to cause it to be heated above its Tg (e.g., about 468° C. (875° F.) to about 482° C. (900° F.)). Then the pressure is increased to about 10.34 MPa (1500 psi) to about 17.24 MPa (2500 psi) at the rate of about 0.14 MPa to 0.17 MPa (20 to 40 psi) per minute. That pressure is then held for about 15 minutes to about 45 minutes to allow the laminate to stabilize. The composite is then cooled at the same pressure before removal from the vessel. Since the resin was substantially cured prior to placement in the pressurization vessel, the molding operation is used primarily to consolidate the composite. Specifically, the high temperatures and high pressures are applied to consolidate the individual layers into a laminate. Exposure to temperatures above the Tg of the resin at high pressures causes the resin to bond and coalesce, forming a dense strong structure.

EXAMPLE

CELAZOLE TM polybenzimidazole resin (Celanese, Charlotte, N.C.) was dissolved in dimethylacetamide to a concentration of 25% at a temperature of 100° C. Thornell T-300 TM (24 by 24 weave, 3K roving) woven graphite fabric, available from Textile Products, Inc. (Anaheim, Calif.) was impregnated with the above solution and air dried for 16 hours. The fabric was rinsed with water and then reimpregnated, dried and rinsed two more times, yielding a resin content of about 28% after drying. The fabric was dried in a circulating air oven at 121° C. (250° F.) for two hours, cut into patterns, placed onto a mandrel and taped in place. The resulting shaped prepregs were debulked by application of 5 layers MYLAR TM polyester shrink tape DuPont De Nemours (Wilmington, Del.). The debulked prepreg was coated with TEFLON TM layer DuPont De Nemours (Wilmington, Del.) coated glass fabric and then three layers of conventional aluminum foil. Conventional masking tape was used to hold the foil in place on the mandrel. The mandrel and attached prepreg were installed into the pressure vessel for molding. The vessel was filled with a combination of two flowable silicone pressurizing media. The high temperature 8026 silicone medium pressurizing media was applied around the tooling and article for a thickness of 3.8 cm (1.5 inches). A layer of conventional aluminum foil was applied over the high temperature 8026 silicone medium to separate it from the subsequent lower temperature 8017 silicone pressurizing media which filled the remainder of the vessel. Heat was applied to the pressurization medium to obtain a pressure of about 0.34 MPa (50 psi) in the vessel. Heat was then applied to the article through the tooling to cause it to be heated to 468° C. (875° F.). At that time, the pressure was increased to about 13.8 MPa (2000 psi) at the rate of about 0.2 MPa (30 psi) per minute. The pressure was held at 13.8 MPa (2000 psi) for 15 minutes and then the part was cooled under full pressure before removal from the vessel.

Analysis of the prepreg at 500° C. (932° F.) for five minutes did not show evidence of blistering or other signs of damage. The dimensional change was less than 0.5% and the weight loss was 2.6%. In addition, analysis showed excellent removal of the lithium salt (e.g., less than 125 ppm) used as a stabilizer and less than 50 ppm of residual dimethylacetamide solvent.

This method may be used to mold a variety of intricately shaped articles that can withstand high temperatures. It is particularly adapted for making a wide variety of aerospace composites such as ramjet, jet engine and rocket components.

This invention makes a significant advance in the field of molding high temperature resin composites. It facilitates the molding of complicated shapes by reducing the problem of hard mold surfaces in matched metal dies. Use of the soft molding medium on at least one surface of the part reduces crushing of fibers. The elimination of volatiles in the prepreg permits rapid cure cycles since temperatures may be ramped up without resulting in bubbles and blisters as volatiles escape from the prepreg. In addition, it can eliminate exotherms in resins which may destroy a composite article. Thus, the process shortens the molding time (e.g., by over half) and eliminates working with hazardous monomers and intermediates. Because of the lack of volatiles, it inherently results in a denser stronger part. Finally, it reduces fiber damage by forming the part at temperatures above the Tg of the matrix resin.

It should be understood that the invention is not limited to the particular embodiments shown and described herein, but that various changes and modifications may be made without departing from the spirit and scope of this novel concept as defined by the following claims.

I claim:

1. A method for molding composite prepregs comprising
   (a) impregnating fiber plies with a solvent solution of a high temperature substantially cured thermosetting resin;
   (b) stacking said impregnated plies to form a composite prepreg; and
   (c) causing a solid flowable particulate silicone polymer to apply a substantially uniform pressure to said composite prepreg to form a composite;
   wherein said composite has reduced fiber damage.

2. The method as recited in claim 1 wherein said resin has a Tg greater than about 232° C.

3. The method as recited in claim 1 wherein said resin is a polybenzimidazole, polyphenyl-quinoxaline or bismaleimide.

4. The method as recited in claim 1 wherein said a solvent is dimethylacetamide, dimethylsulfoxide or normal methyl pyrrolidone.

5. The method as recited in claim 1 wherein said substantially cured thermosetting resin has less than about 5% volatile content.

6. A method for molding composite prepregs comprising
   (a) impregnating fiber plies with a solution of high temperature substantially cured thermoplastic resin that: behaves as a thermosetting resin; can withstand high temperature use without melting; and tends to coalesce under high temperatures and pressures;
   (b) stacking said impregnated plies to form a composite prepreg; and
   (c) causing a solid flowable particulate silicone polymer to apply a substantially uniform pressure to said composite prepreg to form a composite;
   wherein said composite has reduced fiber damage.

7. The method as recited in claim 6 wherein said thermoplastic resin is a polyimide.

* * * * *